US009953469B2

(12) United States Patent
Afshar

(10) Patent No.: US 9,953,469 B2
(45) Date of Patent: Apr. 24, 2018

(54) SYSTEMS AND METHODS FOR RECOMMENDING REPAIR FACILITIES TO A USER BASED ON REPAIR VALIDATION/COACHING DATA

(71) Applicant: Verifacts Automotive, LLC, Newport Beach, CA (US)

(72) Inventor: Farzam Afshar, Newport Beach, CA (US)

(73) Assignee: VERIFACTS AUTOMOTIVE, LLC, Newport Beach, CA (US)

( * ) Notice: Subject to any disclaimer, the term of this patent is extended or adjusted under 35 U.S.C. 154(b) by 0 days.

(21) Appl. No.: 14/836,156

(22) Filed: Aug. 26, 2015

(65) Prior Publication Data

US 2016/0063774 A1 Mar. 3, 2016

Related U.S. Application Data

(60) Provisional application No. 62/043,003, filed on Aug. 28, 2014.

(51) Int. Cl.
| | |
|---|---|
| *G01M 17/00* | (2006.01) |
| *G06F 7/00* | (2006.01) |
| *G06F 11/30* | (2006.01) |
| *G06F 19/00* | (2011.01) |
| *G07C 5/00* | (2006.01) |

(52) U.S. Cl.
CPC ............ *G07C 5/008* (2013.01); *G07C 5/006* (2013.01)

(58) Field of Classification Search
CPC ................ G07C 5/006; G07C 5/008

USPC ........................................................ 701/29
See application file for complete search history.

(56) References Cited

U.S. PATENT DOCUMENTS

| 6,052,631 A * | 4/2000 | Busch ................. B60R 16/0234 701/29.1 |
|---|---|---|
| 6,397,131 B1 * | 5/2002 | Busch ................. B60R 16/0234 701/31.6 |
| 8,265,963 B1 * | 9/2012 | Hanson .................. G06Q 10/10 705/1.1 |
| 9,111,264 B2 * | 8/2015 | Coard .............. G06Q 10/06316 |
| 2002/0072808 A1 * | 6/2002 | Li ..................... G06Q 10/06398 700/5 |
| 2003/0050830 A1 * | 3/2003 | Troyer .................. G06Q 10/06 705/7.38 |
| 2009/0062978 A1 * | 3/2009 | Picard .................... G06Q 10/06 701/31.4 |

(Continued)

*Primary Examiner* — Harry Y Oh
(74) *Attorney, Agent, or Firm* — Brinks Gilson & Lione

(57) ABSTRACT

Systems and methods for recommending repair facilities to a user based on repair validation/coaching data are disclosed. In one implementation, a repair facility recommendation system receives repair information from a user regarding damage to an automobile, the repair information received via a graphical user interface rendered on a webpage. The repair facility recommendation system identifies a repair facility verified to repair the damage to the automobile based on the repair information and verification information from a verification module, the verification information comprising evaluation information based on evaluation of technicians performing repairs of automobiles at repair facilities. The repair facility recommendation system then provides information regarding the identified repair facility to the user via the graphical user interface.

23 Claims, 6 Drawing Sheets

(56) References Cited

U.S. PATENT DOCUMENTS

| | | | | |
|---|---|---|---|---|
| 2009/0083250 A1* | 3/2009 | Riksheim | ............... | G06Q 10/06 |
| 2013/0297143 A1* | 11/2013 | Chen | ..................... | G06Q 10/20 |
| | | | | 701/29.6 |
| 2014/0012460 A1* | 1/2014 | Kleinschmidt | ........ | G06Q 10/20 |
| | | | | 701/31.5 |
| 2015/0172894 A1* | 6/2015 | Gabel | .................... | H04W 4/22 |
| | | | | 455/404.2 |

* cited by examiner

SYSTEMS AND METHODS FOR RECOMMENDING REPAIR FACILITIES TO A USER BASED ON REPAIR VALIDATION/COACHING DATA

RELATED APPLICATIONS

The present application claims priority to U.S. Provisional Patent Appln. No. 62/042,003, filed Aug. 26, 2014, the entirety of which is hereby incorporated by reference.

The present application is related to U.S. Pat. No. 7,487,018 and U.S. Pat. No. 8,428,810, the entirety of each of which are hereby incorporated by reference.

BACKGROUND

Modern automotive maintenance and repair processes require the intensive use of information. As automobile models and the technology they use change from year to year, repair facilities need to constantly acquire and manage new data and knowledge on the appropriate technologies, procedures, and equipment used in repair and maintenance processes. This challenge is compounded by parallel changes in the tools and techniques used for the automobile industry. Many components of the automotive repair industry face these challenges, from collision repair, to inspection procedures, to mechanical repair.

One category of challenges involves the coaching of technical personnel performing the maintenance, inspection, and repairs of automobiles. As procedures change and as new personnel enter the industry or expand the scope of the work they perform, managers need to reliably review and improve the skills of their technical personnel and ensure that a high level of competence is maintained among the technical professionals in the industry.

Further, when vehicle owners, such as automobile owners, search for repair facilities to perform a repair, the vehicle owners desire resources to provide repair facility recommendations. For example, vehicle owners may desire resources that are able to verify that one or more repair facilities employ technical personnel that have performed repair procedures accurately and efficiently to repair similar damage to similar vehicles.

BRIEF DESCRIPTION OF SEVERAL VIEWS OF THE DRAWINGS

Embodiments of the invention described below can be better understood with reference to the following drawings and description. The components in the figures are not necessarily to scale, emphasis instead being placed upon illustrating the principles of these embodiments. Moreover, in the figures, like referenced numerals designate corresponding parts throughout the different views.

DETAILED DESCRIPTION

The present disclosure is directed to systems and methods for recommending repair facilities to a user based on repair validation/coaching data. As discussed in more detail below, a user interacts with a repair facility recommendations system via a user device such as a personal computer, tablet computer, cellular telephone, or any other computing device known in the art. The user provides information such as the type of vehicle to be repaired, the areas of damage to the vehicle, and the extent of the damage to the vehicle. The repair facility recommendation system processes the received information and utilizes information such as validation/coaching data to identify one or more recommended repair facilities where technicians have performed similar repairs on similar vehicles. By utilizing validation/coaching data to identify repair facilities to recommend to the user, the repair facility recommendation system is able to demonstrate to the user that recommended repair facilities have shown an ability to accurately and efficiently perform similar repairs.

Figure 1:
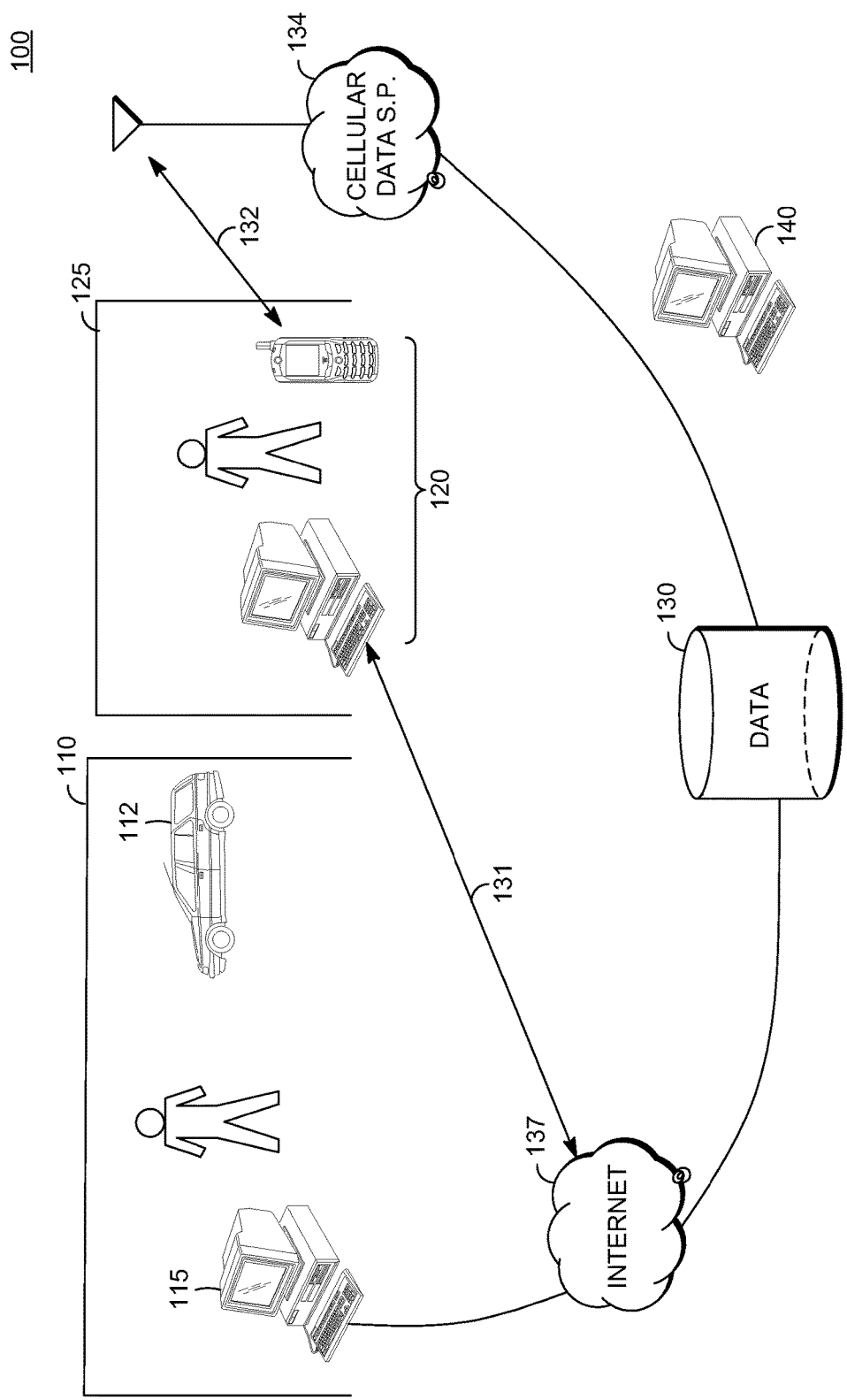
FIG. 1 shows an example of an environment for coaching of automotive services.
Figure 2:
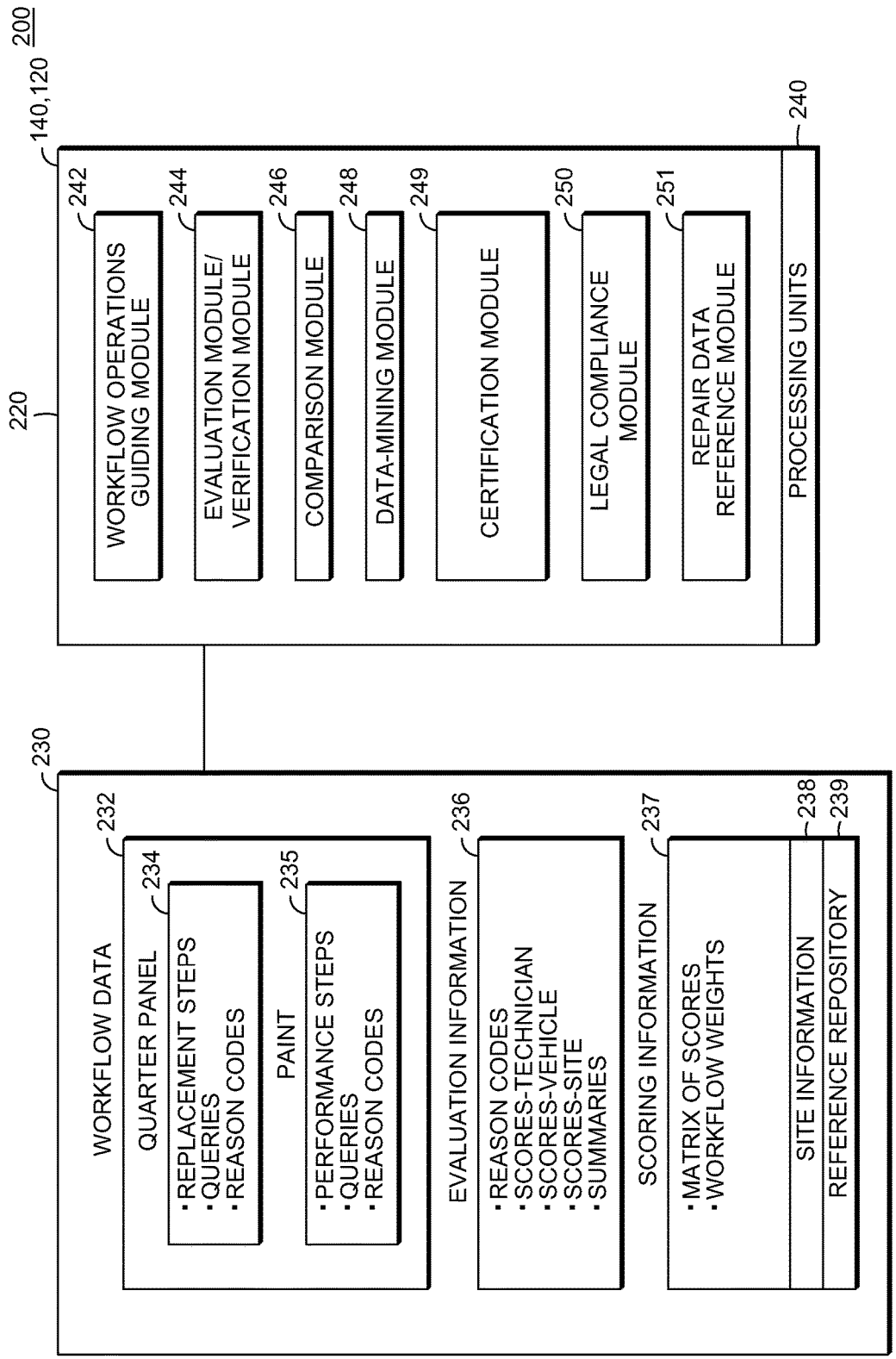
FIG. 2 illustrates one implementation of data and software usable in a coaching system for collision repair services.
Figure 3:
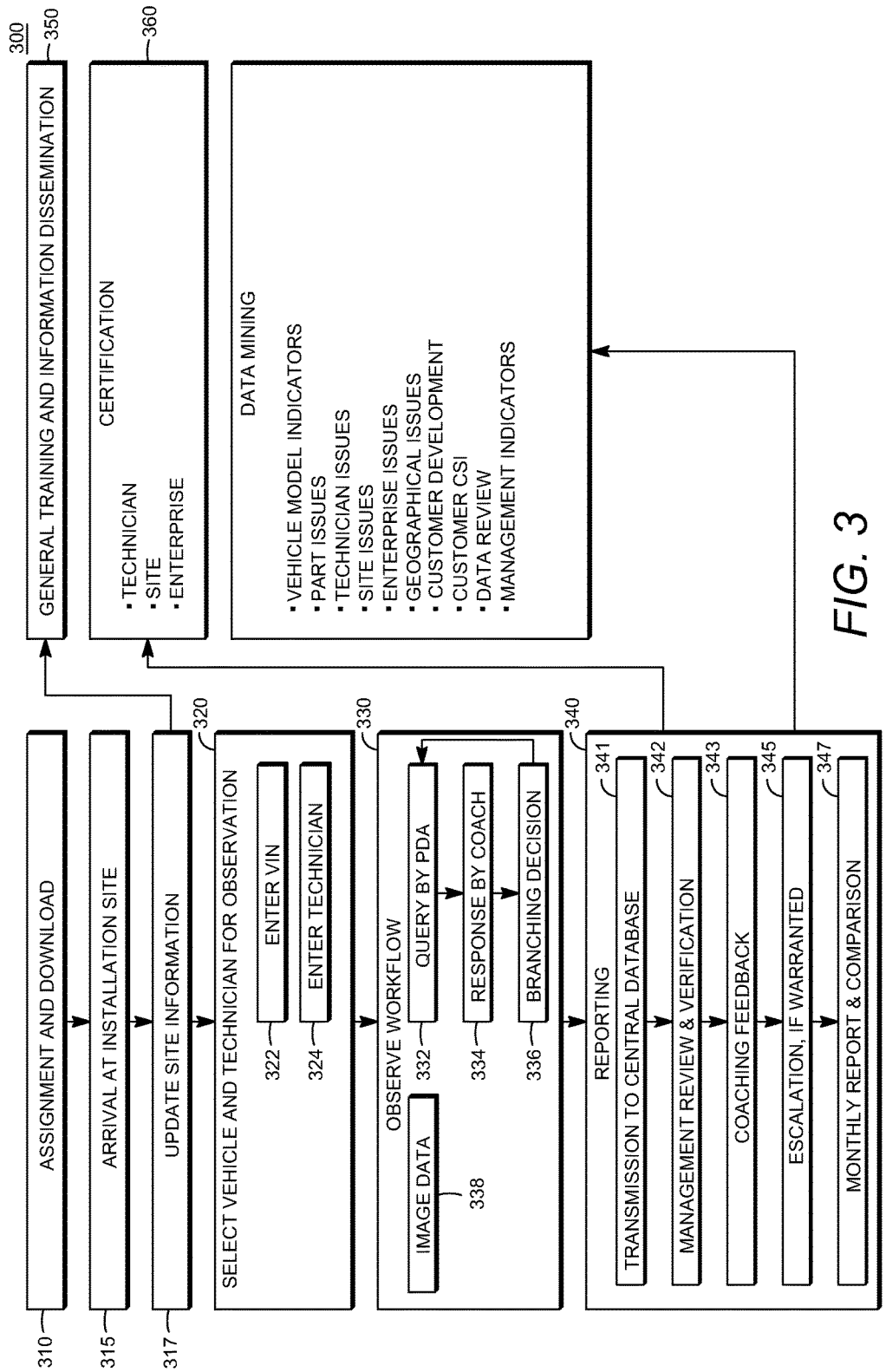
FIG. 3 illustrates acts used in one implementation of a procedure for coaching, review, and certification.

FIGS. 1-3 discuss systems and methods for generating the validation/coaching data. FIG. 1 shows an example of an environment for coaching of automotive services. This depiction includes an installation site 110 at which a vehicle 112 is undergoing repair, and which uses a computer system 115. The depiction additionally includes a coaching facility 125, which in some implementations is distinct from the installation site 110. However, in other implementations the coaching facility 125 may be the same as the installation site 110. As described in more detail below, a computing tool 120 may be present in the coaching facility 125 that is used to assist in coaching of the activities at the installation site 110. Generally, the computing tool 120 may be a personal digital assistant ("PDA"), a laptop or tablet computer, a cellular phone, a desktop computer, a server workstation or any other data device known in the art. In some implementations, the computing tool may be connected through a wireless link 132 and a service provider 134 to a database 130 to update and exchange information. The database 130 may also be maintained through one or more server computers 140. The data may be shared with other computers, such as computer systems 115 at installation sites 110, through an information network 137, such as the internet. Any person that participates in the repair process, such as technicians and managers, may also update information in the database 130 through the computer system 115.

The installation site 110 may be a location where automotive services, such as collision repair, vehicle maintenance, vehicle inspection, or automotive mechanical repair are performed. At the installation site, a number of technicians may work on a vehicle 112 undergoing repair. Generally, a technician may be any person that participates in the repair process. The technicians may follow repair procedures for the type of repairs needed on the vehicle 112. The technicians may obtain the repair information from reference manuals, spoken instructions, shared knowledge, or computer systems 115 used for reference.

To maintain and improve their skills, technicians and their managers may rely on coaches who may review the performance of the technicians and managers, and who may review the operations of the installation site 110 as a unit. Coaches may assist technicians, such as the shop personnel in a collision repair facility or mechanics in a mechanical repair facility, to maintain and expand their technical competence in a field whose knowledge base undergoes continuous change and growth. Coaches may also assist managers with overall quality review of an installation site's work, and with making ongoing improvements throughout the installation site.

To help monitor and improve the level of technical competence in an installation site, coaches may perform periodic visits to the installation site, such as weekly, monthly, or annual visits to the installation site. In some implementations, rather than physical visits to the installation site, coaches may perform periodic virtual visits to the installation site, where the coaches interact with technicians and observe technicians performing vehicle repair procedures using devices such as webcams that provide real-time video conferencing, or other communication mediums such as emails that may include digital images of technicians performing vehicle repair procedures.

During physical or virtual visits, coaches may provide real-time feedback for technicians as the technicians carry out repair steps on a vehicle being repaired, and may further provide review feedback at the conclusion of a repair procedure, at the conclusion of a workflow (a defined portion or series of steps in a repair), or at the conclusion of the repair process. Coaches may further provide on-the-job professional review and advice for groups of technicians and managers during visits, and may evaluate and monitor technical and procedural practices of the technicians, managers, and support staff. One form of value added by coaches may be an ongoing improvement in the quality and efficiency of technical and procedural operations of the installation site 110. As an external observer, a coach may verify the quality, propriety, or completeness of procedures and workflows performed at an installation site. Such a verification by a neutral observer can be a valuable assessment of automotive repair procedures.

With appropriate coordination, coaches may also improve the overall quality and efficiency and consistency of an enterprise of related installation sites, such as a set of installation sites under common ownership, or common branding, or in a franchise relationship or other relationship. Additionally, coaches may guide technicians, installation sites, and enterprises towards the achievement of recognized or customized certification standards. Coaches may also perform a certification-reporting function, whereby the coaches identify technicians, installation sites, and enterprises that have qualified for various certifications.

A coach may use a computing tool 120 to organize and collect information during a physical or virtual site visit. The computing tool 120 may be a mobile device such as a personal digital assistant (PDA), a notebook or tablet computer, a data-enabled cellular telephone, or any other portable data device, or the computing tool 120 may be device such as a desktop computer or a server workstation. In some implementations, the computing tool 120 may include a digital camera, a digital video camera and/or an interface to a portable camera. The computing tool 120 shares information with the database 130 and the server computers 140 through a wired link 131 or a wireless link 132 and a service provider 134. Implementations including wireless links 132 may include a cellular data link provided by a cellular service provider. Other wireless links may also be used, with or without a service provider. For example, the wireless link 132 and the service provider 134 may be augmented or replaced by a satellite link (not shown).

Further, the computing tool 120 may be equipped with a wired communications port or backup port (not shown) that allows the computing tool 120 to connect with the database 130 through non-wireless networks. The wired communications or backup port may be built into the computing tool 120 or may be disposed in an adapter that attaches to the computing tool 120. A wired communication port may be particularly helpful to a coach working in a region where the wireless link 132 is unavailable or unreliable. The wired communication port may provide connections to the database 130 through links such as through a telephone line, or through links made via a local computer (such as the computer system 115 or server computers 140) with a USB, Bluetooth™, infrared, serial, or parallel link, or with a wired or wireless Ethernet link, or other links.

The computing tools 120 may be distributed to a team of coaches who provide coaching services to a number of installation sites 110, as further described below. Computing tools 120 may be shared among coaches, or may be assigned to each coach. Alternatively, computing tools 120 may be provided only to coaches with the best ability to efficiently use the features provided in the tool. Coaches without computing tools may continue to enter information and evaluation data into the database 130 through other networked systems 115.

Software running in conjunction with a processor of the computing tool 120 and the server computers 140 may be written in a variety of languages, such as C, C++, Java, or others, using a variety of programming architectures, including interpreted, compiled, or JIT translations. The software may be configured to run on a variety of operating systems, such as PalmOS™, Windows CE™, Windows™ Linux™, MacOS™, Microsoft.net™, and others.

FIG. 2 illustrates one implementation of data and software usable in a coaching system for collision repair services. This figure shows a data collection 230 and a collection of software tools 220 used in conjunction with one or more processing units 240. In relation to the environment depicted in FIG. 1, the data collection 230 and the software tools 220 may be stored on a variety of media, such as magnetic media, semiconductor media, or optical media, made accessible through the database 130, the server computers 140, and the computing tool 120. The software tools 220 are configured to run on the one or more processing units 240, which may be deployed in the computing tool 120 or in the server computers 140.

The data collection 230 includes workflow data 232, evaluation information 236, scoring information 237, site information 238, and a reference repository 239. The workflow data 232 specifies procedures and steps that may be used in a variety of workflows for collision repair. For example, as illustrated the workflow data 232 includes data on repair procedures for the replacement of quarter panels for automobiles 234 and on a procedure for the painting of an automobile 235. The repair procedures may be indexed or categorized according to the make, model, and year of the automobile under repair. The repair procedures may further be linked to combine larger procedures, such as, for example, in a case where a bumper repair procedure may be linked to a subsequently required paint procedure.

Each procedure in the workflow data 232 may include a description of the steps required in the procedure, in a form that would be useful for a coach reading the steps on a computing tool 120. The workflow data 232 may also include queries associated with each step to prompt a coach for information on the manner in which a technician performs the step. The workflow data 232 may further include prompts for various reason codes to allow a coach to expound on the manner in which a technician performs the step.

For example, a coach may observe, either in person or virtually, a vehicle undergoing the procedure of three-dimensional (3D) measuring, as an initial diagnostic (or as a final check) in collision repair. The process of 3D measuring involves mounting a vehicle on a rack with clamps connected to the vehicle at appropriate points. The positions of the clamps are then measured in order to detect any deformations in the frame or unibody structure of the automobile. To start, the coach may use a computing tool to record identifying information on the vehicle undergoing the repair, the technician performing the procedure, and the installation site at which the repair is being performed. The coach may then proceed to observe the technician performing the 3D measuring, and record observations on the computing tool in response to prompts generated by the computing tool.

One of the steps in 3D measuring may involve a correct application of clamps to the vehicle during the initial phases of the 3D measuring procedure. Accordingly, the procedure data 232 may include appropriate reference information so that the computing tool 120 prompts the coach to check "Were the clamps applied properly?"

In response, the coach may enter a "Yes" or a "No" response. This response may be entered, for convenience, through a selection interface, such as a checkbox or radio button interface on the computing tool. The coach may additionally supplement this response with the selection of a reason code in the workflow data 232. A reason code is a discrete identifier of a reason for a coach's response to an automatically prompted query. For example, a specific reason code may signify "Clamps placed in incorrect location for this model of vehicle" in the context of a query regarding proper application of clamps during a 3D measurement procedure.

In addition to selecting a reason code, the coach may further enter additional textual notes. If the step was not properly completed by the technician, the coach may select a corrective action. For example, the coach may record a decision to escalate the issue to require a discussion with the technician's manager. Alternatively, the coach may record a decision to follow up with personal instruction to the technician, or record a note to receive a prompt for follow-up discussion or checking in a subsequent site visit.

All the prompting information to the coach may be pre-stored in the workflow data 232. The responses from the coach may be stored as the evaluation information 236. The evaluation information may include the responses from the coach during an observation of various procedures performed by a technician as part of a workflow for a vehicle. The responses may include reason codes entered by the coach. Further, the evaluation information 236 may include numerical scores based on the responses entered by the coach, along with summaries of a coach's evaluation. The manner in which the numeric scores and the summaries may be generated is described below.

Thus, the data collection 230 includes information on queries posed to coaches, such as the queries and the possible reason codes in the workflow data 232, and responses from the coaches, such as the coach's answer and the selected reason codes in the evaluation information 236. In addition, the data collection includes the scoring information 237. The scoring information is used to generate numerical scores from the responses entered by a coach. For example, the scoring information may include a matrix of scores that holds numeric score values, each of which corresponds to a particular reason code or other response entered by a coach for a particular step of a particular procedure.

For example, consider the situation described above, where a coach notes that a technician has failed to properly apply clamps during 3D measurement. In response to the query "Were the clamps applied properly?," the coach may select responses of "No"/"Clamps placed in incorrect location for this model of vehicle." These responses may be stored as digital information identifying the reason code. For this procedure, this query number, and this response, the matrix of scores may hold a numeric value of "3," indicating that the technician has obtained a relatively low score for this step in the 3D measurement procedure. The score would be correspondingly higher if the technician had correctly performed the workflow step, and correspondingly lower if the technician had performed in a worse manner. For example, the matrix of scores may hold a value of "10" for reason codes indicating that the coach's response was "Yes"/ "Clamps properly positioned." The matrix of scores may hold a value of "0" for reason codes indicating that the coach's response was "No"/"Clamps not applied to vehicle."

Numerically, a score in the matrix of scores may be designated by a variable s. The score may be indexed by the particular query and response to which it corresponds, which may be designated by variables q and r, respectively. Thus, the score generated from the matrix may be indicated by the quantity s(q,r), which may be seen as a reference table or as one implementation of the matrix of scores. If a coach scores a total of N steps for a technician working on a workflow for a vehicle, the resulting average score may be calculated numerically. For example, one implementation may use a formula having the following form.

$$\text{Score} = \frac{1}{N}\sum_{i=1}^{N} s(q_i, r_i)w.$$

Here i is an index for a particular query, and w is a weighting factor for the particular procedure being evaluated. The indexes $q_i$ and $r_i$ indicate the various queries and responses, respectively. In addition to the averaging indicted in the above formula, additional averaging may be performed over several observed procedure s, each of which may have a different value of weighting factor w. The numeric score value and the weighting factor may be adjusted by system administrators. In some implementations, the weighting factor may be adjusted to allow user customization. The adjustability of the workflow weighting factor allows an independent control over the contribution of different procedures as reflected in total scores. Similar adjustability may also be provided for aspects of the matrix of scores.

Other scoring techniques are also envisioned. For example, a scoring system may be used without reason codes. Instead, the scoring may be based on a binary evaluation, such as a series of pass/fail or correct/incorrect responses entered by a coach. In this case a scoring technique may use a calculation with a simplified formula in which a coach's response is represented by a binary variable r having a value of 0 or 1.

$$\text{Score} = \frac{1}{N}\sum_{i=1}^{N} s(q_i)r_i w.$$

Various combinations of these scoring systems may also be implemented, and may also use additional weighting factors. For example, weighting factors and other scoring tools may be employed to reflect degrees of difficulty based on the model of car under repair, on the newness of a procedure, on the experience level of a technician, on the degree of difficulty of an overall workflow, or on the precision required in a particular aspect of a repair, among others.

The data collection 230 may also include the site information 238 and the reference repository 239. The site information 238 may hold data regarding individual installation sites. For example, the site information 238 may include the names and positions of technical and non-technical personnel at an installation site, the types of equipment available at the installation site, and information on previous coaching and evaluations performed at the installation site, among others. The computing tool 120 may use data from the site information 238 to assist a coach in locating an installation site to be reviewed, to recall the names of staff members at the installation site, and to recall notes on previous visits to the installation site. The reference repository 239 may include a variety of reference material of interest to coaches, technicians, and other personnel. The reference repository may be accessible through devices such as the computing tool 120 or other networked computer systems 115 or servers 140. The reference repository may include internet links for information on collision repair materials and processes, a library of articles for teaching and reference on collision repair of automobiles, diagrams showing procedures and detailed procedures for collision repair of automobiles, and other industry-specific information to support the coaching, technical, and procedural activities of technicians, installation sites, and enterprises.

The software tools 220 shown in FIG. 2 include a workflow operations guiding module 242, an evaluation and verification module 244, a comparison module 246, a data-mining module 248, a certification module 249, a legal compliance module 250, and repair procedure compliance module 251. These modules may be implemented using various combinations of logic circuitry, including software implementations that may run on the processing units 240 in the computing tool 120 or the server computers 140.

The workflow operations guiding module 242 may be configured to run on the computing tool 120. The workflow operations guiding module 242 may provide instructions, prompts, and dialog interfaces to guide a user through a coaching of one or more repair procedures or workflows. For example, the workflow operations guiding module 242 may use information from the workflow data 232 to provide a user interface that follows a coach through various steps in a repair procedure. The workflow operations guiding module 242 may prompt the coach with questions for evaluating each step in a procedure. The sequence of questions may be predetermined and linear, or may include decision-point branching, in which the choice of which questions to pose depends on answers received for previous questions. This branching may be based on decision point data stored in the workflow data 232. The workflow operations guiding module 242 may allow a coach to skip steps. For example, if circumstances require a technician to omit or temporarily delay a particular procedure step, or if that procedure step is not yet completed, the coach may skip the query for that step and proceed to observe the next step or procedure performed by the technician—or by another technician. The workflow operations guiding module 242 may also allow a coach to review and edit the responses entered for each query. The workflow operations guiding module 242 may then store the response information received during observation of a procedure in memory on the computing tool 120 (and/or in the database 130), as new data for the evaluation information 236.

The evaluation module 244 uses data gathered through the workflow operations guiding module 242 and other data in the evaluation information 236 to create a review of the evaluation information 236. The evaluation module 244 evaluates and verifies evaluation information 236 from assimilated sources such as vehicle manufacturers, vehicle testing organizations, industry-recognized training organizations, etc. The review may be in the form of numeric scores for technicians, installation sites, and enterprises. The evaluation module 244 may use the scoring information 237 to generate the numeric scores from the received evaluation information 236. The numeric scores may be combined with textual information supplied by a coach through the evaluation module to generate reports for the evaluation and coaching of technicians and other personnel, installation sites, and enterprises. Outputs generated by the evaluation module may be stored in the evaluation information 236. Technicians, managers, and others may be provided access to the outputs through printed hard copies or through electronic access via computers such as the computer system 115 or the server computers 140.

The software tools 220 may include components for verifying one or more procedures that a technician has performed on an automobile. That is, as an automobile proceeds through a workflow, the software tools 220 may guide a coach through appropriate analyses so that the coach can perform an objective third-party certification that verifies the observed procedures have been properly executed according to predetermined criteria. The computing tool 120 may be configured with software that allows a coach, as an external observer, to verify the quality, propriety, or completeness of procedures and workflows performed at an installation site. Such a verification of manufacturer-required or industry accepted best practices by a neutral observer can be a valuable assessment of automotive repair procedures. In the example of FIG. 2, the verification is implemented in the evaluation module 244, so that this module is a combined evaluation and verification module. In this example, verification data are gathered while the responses from a coach are analyzed by the evaluation module 244. In other implementations, the verification procedures may be implemented by other modules or combinations of modules. For example, verification may be implemented by the workflow operations guiding module 242, so that a computing tool 120 collects verification data immediately as a coach enters responses to queries on the computing tool 120. In other embodiments, the workflow operations guiding module 242 and the evaluation module 244 cooperate to verify operations and procedures performed by a technician.

The comparison module 246 reviews the evaluation information 236 and generates comparison summaries for technicians, managers and other shop personnel. The comparison summaries may be generated in hard copy or electronically. For example, the comparison module may generate a summary report comparing a particular technician's scoring information with an overall or average scoring for technicians in the same installation site. Such comparisons may be helpful for evaluation or professional coaching of a technician. The comparison summary may be stored among the summary information in the evaluation information 236. The installation site or shop personnel may obtain access to the comparison summary through the computer system 115. Other comparisons that may be generated include: comparisons of a technician with other technicians in the same pay grade, comparisons of a technician with other technicians in the same city or other geographical region, comparisons of a technician with other technicians in the same enterprise, comparisons of a technician with all technicians for whom data are available, or others. Combinations of these comparisons are also possible. For example, the comparison module may be configured to generate a comparison of a technician with all other technicians in the same enterprise, and in the same city, and with the same certifications.

In addition to preparing comparisons of technicians, the comparison module 246 may also generate comparisons of installation sites, groups of installation sites, and enterprises. For example, the comparison module 246 may be configured to compare one enterprise against another. Many other comparisons are also possible, such as comparing an installation site with other installation sites in the same enterprise but in a different region of the country, with similar or different demographics, etc.

The comparison module 246 may also allow specialization or customization of comparison groups. For example the comparison module 246 may allow a peer group to be defined as a group of installation sites within a particular revenue bracket and having a service relationship with a particular insurance company. Such customization may be implemented by and accessed through a central server or the database 130. Alternatively, or in addition, such customized peer groups may be defined by individual users, such as the managers of installation sites. Other examples of criteria by which peer groups may be defined include technical criteria (type of equipment available at an installation site or throughout an enterprise, models of vehicles served by technicians at an installation site, certifications attained by technicians, certifications attained by installation sites, number of service bays present in an installation site, or others), business criteria (revenue levels, number of employees, status as a woman-owned or woman-operated or minority-owned company, affiliation with other enterprises or insurance companies, or others), geographical criteria (customized combinations and definitions of city/state/county/region, for example), other criteria, and combinations thereof.

As part of the vehicle repair process, site personnel and coaches typically compare the repair process to repair rules and guidelines to validate that the repair process complies with local, state or federal legal requirements, as well as vehicle-specific repair procedures identified by a vehicle's manufacturer, vehicle testing organizations or industry training organizations. The repair rules and guidelines are generally validated at three points in time surrounding the repair process. The repair rules and guidelines are first validated before the repair process begins. The repair rules and guidelines are then validated during the repair process, and again after the repair process is complete.

Generally, shop personnel validate the repair rules and guidelines before the repair process begins and a coach validates the repair rules and guidelines both during the repair process and after the repair process is completed. A coach validates the repair rules and guidelines by measuring and assessing work performed by the shop personnel. The legal compliance module 250 and the repair procedure compliance module 251 enable the coach and shop personnel to share common repair rules and guidelines to ensure a cohesive adherence to repair rules and guidelines throughout the entire repair process. The legal compliance module 250 and repair procedure compliance module 251 are unique in that both shop personnel and the coach may use similar modules 250, 251, where only the coach will typically use the workflow operations guiding module 242, evaluation and verification module 244, comparison module 246, datamining module 248, and certification module 249.

Shop personnel may use the legal compliance module 250 and the repair procedure compliance module 251 as they develop a repair blueprint for a vehicle. A coach may then use the repair blueprint, and a legal compliance module 250 and repair procedure compliance module 251 similar to those used by the site personnel to develop the repair blueprint, to assist the coach in evaluating site personnel who developed the repair blueprint and site personnel who are responsible for repairing a vehicle according to the repair blueprint.

In some implementations, shop personnel develop the repair blueprint for the vehicle through interactions with the computing tool 120, the legal compliance module 250, and the repair procedure compliance module 251, where the computing tool 120, legal compliance module, and/or the repair procedure compliance module 251 automatically determine a suggested repair blueprint (the vehicle repair procedure) based at least in part on an intelligent decision whether to repair a damaged component of a vehicle versus whether to replace the damaged component of the vehicle. It will be appreciated that when a damaged component of a vehicle is replaced, the damaged component is replaced by a component that was not previously part of the vehicle. When a damaged component of a vehicle is repaired and not replaced, the damaged component is not replaced by a component that was not previously part of the vehicle.

A suggestion of whether to repair a damaged component of a vehicle versus whether to replace the damaged component of the vehicle may be based on factors such as a cost of a new component; a cost of additional components that may need to be replaced when replacing the damaged component; labor costs associated with repairing the damaged component vs. labor costs for replacing the damaged component; the cost of painting components surround a replaced component (also known as blending); and/or the amount of time a vehicle must be present in an installation site to repair the damaged component of the vehicle vs. the amount of time the vehicle must be present in the installation site to replace the damaged component of the vehicle. In some implementations, these factors may be established based on previous coaching reports regarding coaches observing technicians performing similar repairs. It will be appreciated that by automatically providing a repair blueprint that suggests whether to replace a component of a vehicle versus whether to repair a component of the vehicle based on actual repair procedures that coaches have previously observed, the computing tool 120, the legal compliance module 250, and/or the repair procedure compliance module 251 are able to provide more accurate estimates for repair procedures.

Generally, the legal compliance module 250 and the repair procedure compliance module 251 serve as an automated, "upfront" validation that the high-level requirements for a quality repair will be met through an accurate repair blueprint, in contrast to the workflow operations guiding module and the evaluation and verification module which identify how well the actual repair has been made through a step-by-step evaluation and analysis process of the repair procedures that the repair technician(s) used.

Repair technicians use the repair blueprint as their work order or roadmap to determine what repairs are required on the vehicle. Therefore, the repair blueprint is typically specific to the year, make and model of vehicle and developed by an estimator before repairs commence on the vehicle. The developed repair blueprint should comply with any local, state or federal legal requirements, and any vehicle-specific repair procedures identified by a vehicle's manufacturer, vehicle testing organizations or industry training organizations. If the repair blueprint does not comply with legal or repair procedure requirements, the resultant vehicle repair will likely not satisfy legal or repair procedure requirements.

Typically, the legal compliance module 250 will review a repair blueprint by analyzing information in predetermined data fields of the repair blueprint to determine whether the individual items in the blueprint comply with local, state or federal rules, as applicable. This analysis may be done in realtime, interactive mode on each individual item as the repair blueprint is being developed, or after the repair blueprint has been developed through a batch process which will analyze the entire blueprint at once. The legal compliance module will select the appropriate legal compliance rules from the database and apply them against the repair blueprint to determine whether the repair blueprint passes a compliance test. In some cases, the rules will be "hard" rules which must be complied with, whereas other rules may serve as suggestions to improve the repair blueprint.

In one example, in the state of California, the Bureau of Automotive repair requires that a quarter panel replacement operation be described as a "section" on the repair blueprint if only a portion of the quarter panel will be installed on the vehicle. In this example, the legal compliance module will analyze the repair blueprint, select the appropriate legal compliance rules from the database (in this example, for California), compare the rules against the operations included on the repair blueprint (in this example, "replace quarter panel") and pose the appropriate question to the user (in this example, "Will the entire quarter panel be installed or just a partial replacement?"). If the answer is "partial," the system will prompt the user to change the operation in the repair blueprint from "replace" to "section." In another example, if additional damage is found on the vehicle after the original repair blueprint has been developed, certain states may require written authorization from the vehicle owner prior to commencing any additional repairs on the vehicle. In this example, the legal compliance module 250 would determine that a supplemental repair blueprint is being developed, select the appropriate legal compliance rules from the database, and prompt the user to document the method of authorization obtained, such as whether authorization was done in person or through e-mail, etc., name of the person who authorized the repairs, the date and time of the authorization, etc.

Typically, the repair procedure compliance module 251 will review a repair blueprint by analyzing information in predetermined data fields of the repair blueprint to determine whether individual items in the repair blueprint comply with any vehicle-specific repair procedures identified by the vehicle's manufacturer, vehicle testing organizations or industry training organizations. The repair procedure compliance module 251 may determine whether individual items in the repair blue print comply with vehicle-specific procedures in a real-time, interactive mode as the repair blueprint is being developed, or after the repair blueprint has been developed through a batch process which will analyze the entire repair blueprint at once. The repair procedure compliance module 251 will select the appropriate repair procedure compliance rules from the database and apply them against the repair blueprint to determine whether the repair blueprint passes a compliance test. Repair procedure compliance rules may follow a hierarchy approach, based on the specific vehicle, operation and part identified in the repair blueprint. At the most detailed level, repair procedure compliance rules will apply to a specific repair operation (such as "replace", "section", "remove and install", "remove and replace", etc.) and a specific vehicle part (such as a "door skin", "frame rail", "upper unibody frame", etc.) and a specific vehicle (such as "2002 Honda Pilot with VIN number 12345"). The following illustrates how the hierarchy convention may apply:

Retrieve and apply any repair procedure rules for the vehicle Year, Make, Model and VIN.

If no repair procedure rules are available for the vehicle Year, Make, Model and VIN, retrieve and apply any repair procedure rules for the vehicle Year, Make and Model.

If no repair procedure rules are available for the vehicle Year, Make and Model, retrieve and apply any repair procedure rules for the vehicle Make and Model.

If no repair procedure rules are available for the vehicle Make and Model, retrieve and apply any repair procedure rules for the vehicle Make.

If no repair procedure rules are available for the vehicle Make, retrieve and apply any general repair procedure rules for the repair operation.

As an example, the repair procedure compliance module 251 may contain three rules: one rule regarding a Toyota Tundra which indicates that the lower perimeter frame rail can not be sectioned, a second rule which applies to any Toyota frame rail which indicates the upper unibody frame rail can not be sectioned, and a third rule which applies to any frame rail on any vehicle. In this example, if the repair blueprint is developed for a 2004 Toyota Tundra and identifies that the upper unibody frame rail is being sectioned, the repair procedure compliance module 251 will analyze the repair blueprint, select the appropriate repair compliance rules from the database (in this example, rule number two for any Toyota frame rail since the upper unibody frame is being repaired, not the lower perimeter frame), and indicate to the user that the selected operation is invalid for the vehicle being repaired.

Once site personnel develop the repair blueprint and the repair process begins on the vehicle, the coach may review the repair blueprint to confirm the vehicle is being repaired, or has been repaired, in compliance with the repair blueprint. In one embodiment, a copy of the repair blueprint is transferred electronically to the computing tool of the coach using industry-standard communication methods defined by the Collision Industry Electronic Commerce Association (CIECA), ACORD, ANSII, or other mechanical repair standards organizations, or through the use of a proprietary interface method. In other embodiments, a paper copy of the blueprint may be made available to the coach to facilitate the review process.

Once the coach receives the repair blueprint, the coach may access a legal compliance module 250 or a repair procedure compliance module 251 on the computing tool similar to those used by the site personnel to develop the repair blueprint. However, the legal compliance module 250 and repair procedure compliance module 251 accessed by the coach may not be the same legal compliance module 250 and repair procedure compliance module 251 used by the site personnel to develop the repair blueprint. The legal compliance module 250 and repair procedure compliance modules 251 accessed by the coach provide reference information that the coach can use in evaluating the site personnel. Typically, the modules 250, 251 provide the coach with a series of questions on the computing tool used to evaluate whether the repair blueprint complies with local, state or federal legal requirements, or vehicle-specific repair procedures identified by a vehicle's manufacturer, vehicle testing organizations or industry training organizations. In one embodiment, the most recent compliance rules may be downloaded when the coach connects the computing tool to a server to download new evaluation assignments.

In addition to evaluating shop personnel, a coach may also use the repair procedure compliance module 251 as a tool to mediate disputes between shop personnel, customers, and insurance company personnel. During development of a repair blueprint, it is not uncommon for disputes to arise between shop personnel, customers and insurance company personnel regarding the best method for repairing a damaged vehicle. To mediate a dispute, shop personnel may request a coach serve as an independent third-party mediator. Along with the mediation request, shop personnel may send supporting documentation to the coach such as the repair blueprint, digital images, and frame and alignment specifications. The coach may then view the mediation request and supporting documentation on the computing tool or through another interface method. Additionally, the coach may access the repair procedure compliance module 251 to assist the coach in offering a recommendation to the disputing parties. Typically, the mediation request is routed to the coach that is most qualified to address the specific issue in dispute.

FIG. 3 is a block diagram of one implementation of a procedure for coaching, review, verification and certification. In act 310, a coach is assigned to provide coaching at a client's facility, which may be a collision repair shop or other installation site. The assignment may be downloaded onto a computing tool. Appropriate software and data may be pre-loaded onto the computing tool. If needed information or software is not available on the computing tool, the coach may download the appropriate material onto the computing tool prior to visiting the installation site. If the coach is physically visiting the installation site, the computing tool may assist the coach with directions to reach the installation site. If the coach is virtually visiting the installation site, the computing tool may assist the coach in setting up a communication channel, such as a video teleconference, with the installation site. The computing tool may additionally provide advance reminders regarding protocol and amenities at the installation site, or any other type of available information that may be useful to a coach visiting an installation site. For example, the computing tool may provide a reminder such as, "Today is technician Ms. Smith's birthday," or "Make initial greeting with shop manager Davis," or "Join the staff for their Friday donuts prior to 7 AM shop opening."

In act 315, the coach initiates a visit with the installation site. When a coach physically visits an installation site, act 315 may occur when the coach arrives at the installation site to be evaluated and checks in with local personnel, aided with reminders by the computing tool. When a coach virtually visits an installation site, act 315 may occur with the coach establishing communications with the installation site, such as establishing a video teleconference, and checking in with the installation site personnel, aided with reminders by the computing tool. The coach may obtain updated personnel information and other site-specific information at this time and enter such updates into the computing tool so that a central database may be apprised of any changes. Additional initial procedures may be performed, such as an evaluation of shop cleanliness and safety compliances.

In act 320, the coach selects a vehicle and a technician performing repairs on the vehicle. The coach may then observe repair activities performed on the vehicle by the technician and record observations on the computing tool. The vehicle may be identified by a vehicle identification number (VIN) or other information that may identify the vehicle in act 322. The technician may be identified by name or by an employee number in act 324. Act 320 may include additional preparatory steps. For example, once the coach has identified the procedures to be observed, the computing tool may have an option to automatically print some relevant reference diagrams for the procedures. The printing may be done either with a built-in printer or by transmitting to a local printer or print server via a local IR or RF wireless link.

The coach observes the repairs in act 330. The coach may first consult with the technician to understand what repair procedures are to be performed on the vehicle. The coach then selects an appropriate procedure data set on the computing tool to match the procedures that will be or have been performed by the technician. The computing tool then provides the coach with a series of queries 332 that allow the coach to enter responses 334 regarding the performance of the technician. After each query and response, the computing tool proceeds to the next appropriate query and response to match the next step that should be performed by the technician. In some cases, the computing tool will come to a branching point, at which there may be several possible subsequent steps. At these branching points 336, the computing tool may query the coach to ask which step is being performed next by the technician, or what procedures will be observed next. Alternatively, when appropriate, the computing tool may select a subsequent query based on the coach's response to a previous query.

In addition to entering textual or selection information, a coach may enter photographic information 338 into the computing tool. For example, when a coach physically visits the installation site, the coach may use an attached camera (or a camera integrated into the computing tool) to record photographic information such as digital images. Alternatively, when a coach virtually visits the installation site, the coach may record digital images of a repair procedure such as video from a video teleconference or digital images, such as photographs or videos, emailed to the coach from a technician. Digital images, such as video or photographs, may be stored on the computing tool or in a remote database. Such digital images may be useful to record images of work performed on interior portions of an automobile, before those portions are hidden by outer layers of material during subsequent procedures. Such digital images may also be useful to document the verification of procedures in a workflow. Digital images may also be helpful coaching tools, to illustrate examples of incorrectly performed procedures. Similarly, digital images may be valuable tools for the coaching of technicians with overall good practices, but who could benefit from fine adjustments in technique. Digital images may also be used to record examples of high quality work, for use as examples in providing positive feedback and in coaching other personnel.

After the coach has completed or terminated observation of the procedure, the computing tool then reports the results of the coach's observations in act 340. The computing tool may make a transmission of the observations (or a summary of the observations) to a central database in act 341. This transmission may include an automatic transmission of the digital images discussed above with respect to act 338, emails, or other communications with appropriate supplemental information that is tailored to the observations made by the coach. For example, if the coach's observations indicate that a technician experienced some difficulty or confusion in the application of seam sealer, the transmission in act 341 may automatically include some links or PDF files or flowchart diagrams or standards requirements that would be instructive to the technician or the technician's manager for further reference and review. For example, the transmission may include relevant step-by-step flowcharts, torque tolerances and limits, a review of optional procedures that may be of interest to a customer, a list of recommended testing techniques to verify the quality of repairs, or other information. Such information may be obtained from a local or a remote repository, such as the reference repository 239.

The coach may review notes on the computing tool to provide a coaching feedback to the technician at the installation site in act 343. Feedback may also be provided to the management personnel at the installation site. The immediate feedback may also include reference material that is manually or automatically selected to be appropriate for the review. Such material may be obtained through the computing tool from the reference repository 239, for example. Additionally, the coach may report on the observations to the management of an installation site in act 342. A report to management may include a combination of observations on several technicians, as well as on support staff, management, and procedures at the installation site.

The coach's reporting may also provide the service of verifying the procedures, workflows, and overall operations observed by the coach at the installation site and certifying a repair based on the verification of the repair steps performed during the repair procedures. Thus, the reporting in act 342 may include both a review and verification of an installation site or the personnel at the installation site, and a review and verification of the performed repair. Here, the coach may provide a installation site with the benefit of a third-party review that verifies and certifies activities at the site. Such verifications and certifications may assist an installation site (and the installation site's sponsoring customers and insurance companies) by providing external evaluations on the workflows performed on specific vehicles, on the competence of technicians, and on the installation site's overall procedures, quality and performance.

The reporting may further include an escalation 345 if the coach determines that the participation of others is needed to provide further coaching, refresher information, feedback, or other actions. The data collected may also be provided in monthly reports, trend graphs, and comparison summaries in act 347. After-visit reporting and coaching may also include interactive communication, such as a scheduled post-visit, "tele-coaching" via telephone or email or coaching in response to follow-up questions from personnel at an installation site. During "tele-coaching," a coach may answer additional questions or resolve issues based on the coach's offsite review of digital images of a vehicle's damage.

The computing tool may provide interfaces for other information collection as well. For example, the computing tool may include interfaces to record changes in the staff at an installation site. More specific information may also be recorded, such as an unexpected absence of a technician, or the departure of an experienced manager. Such information may be useful in interpreting monthly reports and performance trends. For example, if a senior technician retires from an installation site, that fact may be helpful in understanding a subsequent dip in a monthly performance review for the installation site.

The coach may also be assisted by the computing tool to provide information for generalized ongoing professional improvement 350 to personnel at an installation site. Alternatively, or in addition, the coach may provide individualized professional training to improve the skills of a particular technician, site personnel, installation site, or enterprise. These activities 350 may involve a dissemination of literature, flow diagrams, charts, or other relevant information. For example, the computing tool may include reference information that the coach may consult as needed while answering specific questions during discussions with personnel at an installation site. The computing tool may further include a lecture presentation with a "Topic of the Month" to be provided to an audience of technicians or site personnel at the conclusion of a visit to an installation site. The computing tool may be used to disseminate information for the advancement of professional expertise throughout the course of a site visit, following any initial procedures such as, for example, act 317.

Additional coaching tools may also be provided through the computing tool. For example, the computing tool may include tools for identifying knowledge gaps for particular technicians; site personnel such as managers, estimators, and administrative personnel; installation sites; or enterprises as a whole. This identification may be based on data mining of scores and evaluation information received through coaching procedures. Knowledge gaps may be used to generate specific immediate specialized instruction or to prepare an ongoing program for further development. For example, a series of "Topics of the Month" may be selected, or one-on-one personalized coaching provided, or a customized hands-on coaching clinic delivered, based on identified knowledge gaps.

The reporting information assembled in act 340 may be used for more than immediate coaching and periodic review. For example, the data collected by a coach and the subsequent analyses may be used to provide information in support of a certification program 360. Certifications may be made for individual technicians, for installation sites, and for enterprises, for example. The data may also be used for data mining, as illustrated in act 370. For example, the data may be searched, either on the coach's computing tool or by a central computer, for correlations, patterns, or subtle connections related to issues arising for particular vehicle models, parts, technicians, installation sites, enterprises, and geographical factors, among other issues, and combinations thereof. Technicians may additionally search the data for assistance before performing a vehicle repair procedure. For example, before performing a repair, a technician may search for a video, instruction, notes, Topic of the Month, reference material, or pictures that were previously used to coach other technicians performing a similar repair so that the technician may learn how to perform the repair before performing the actual vehicle repair procedure.

The data may also be mined for customer development, to better provide services for the customers of an installation site or enterprise. Data mining may also include customer satisfaction indexing (CSI), which searches for correlations between customer satisfaction and quality of repairs. For example, the mining may seek to determine which positive and negative scores among the various procedures of collision repair have the most significant impact on customer satisfaction as indicated by customer surveys, repeat business, complaints, and compliments. Data mining may also involve a review of data for consistency in the "paperwork" side of an installation site's activities. For example, a software tool may be used to double-check a paper trail (or a data trail) for mistakes in completed workflows (such as a missed intermediate inspection as part of a larger workflow), so that corrections may be made before a workflow is erroneously closed. On another scale, data review may perform ongoing consistency checks to catch unlikely but crucial errors (such as an inadvertent billing for a procedure that was not performed). A further example of data mining may include the mining of management indicators, to ascertain what qualities of management personnel (certifications, personality scores, education, geographical background) have positive or negative correlations with overall customer satisfaction, or with customer satisfaction in various geographical regions.

Figure 4:
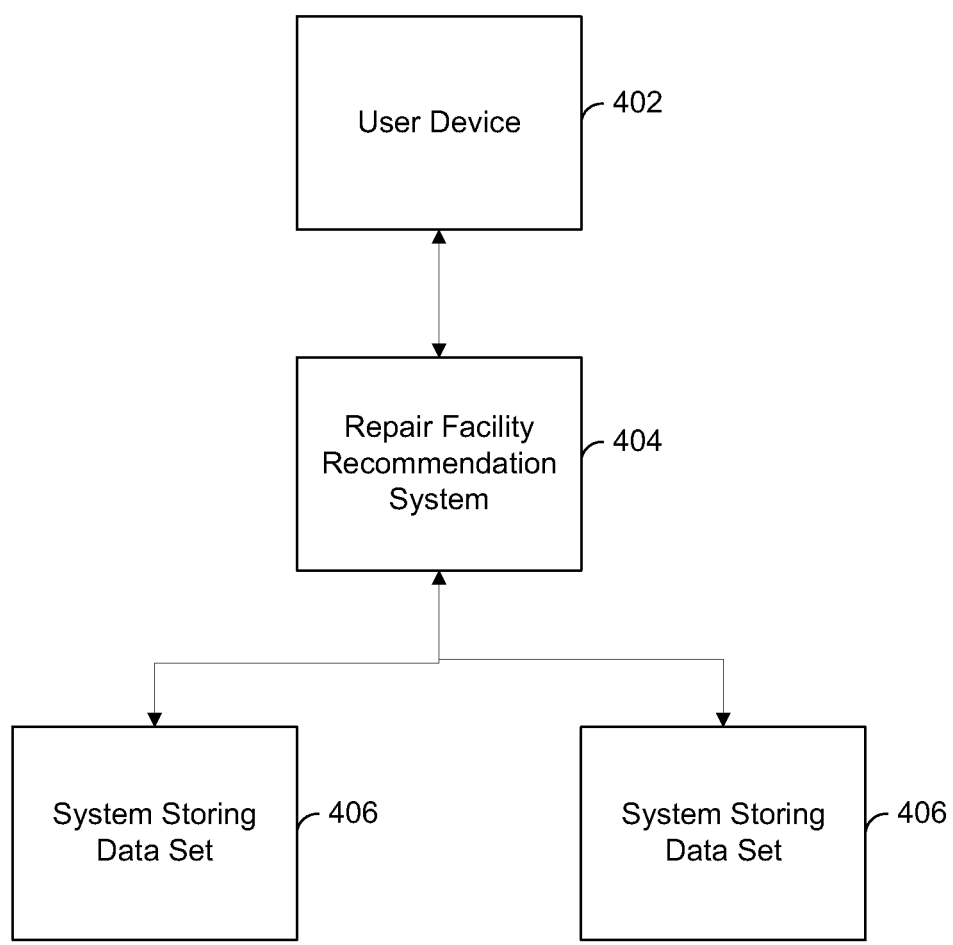
FIG. 4 illustrates an example environment in which the repair facility recommendation system may operate.

As noted above, a repair facility recommendation system may also utilize the verification/coaching data to intelligently suggest repair facilities to a user. FIG. 4 illustrates an example environment in which the repair facility recommendation system may operate. The environment includes a user device 402, a repair facility recommendation system 404, and one or more systems storing data sets 406, such as the coaching system for collision repair services described above with respect to FIGS. 1-3 that includes a verification module.

Generally, the user device 402 may be a personal computer, a cell phone, a tablet computer, or any other computing device including hardware such as one or more processors and non-transitory computer-readable storage systems, as is known in the art. A user interested in locating a repair facility for repairing a vehicle interacts with a graphical user interface rendered on the user device 402. The user device 402 may render the graphical user interface on a webpage within an Internet browser or within a stand-alone application, for example.

The user interacting with the webpage or the stand-alone application provides information on the damaged vehicle such as the make, model, year, vehicle identification number ("VIN number"), or any other type of information that may assist the repair facility recommendation system in identifying the type of vehicle to be repaired.

The user interacting with the webpage or the stand-alone application may additionally provide information on the actual damage to the vehicle. In some implementations, the user may describe in words the damage to the vehicle.

In additional implementations, after the user provides information on the vehicle to be repaired, the user device 402 may render an image or other graphical representation/image of the vehicle to be repaired. The user may then interact with the image of the vehicle to click on, touch, or identify in any other way on the image, the location of portions of the vehicle to be repaired. The user may additionally interact with the user device 402 to provide information such as a degree of damage for each portion of the vehicle to be repaired, whether or not the vehicle is driveable, a preferred location for the repair facility, a preferred range from the user for the repair facility, and/or any other type of information that may be useful to the repair facility recommendation system 404 in identifying repair facilities that are able to perform the requested repair.

The repair facility recommendation system 404 may be implemented as software code stored in a non-transitory computer-readable storage medium that is executed in conjunction with one or more processors such as a single server, a plurality of servers, or any other type of computing device known in the art. As the user interacts with the user device 402 regarding the requested repair, the user device 402 transmits information to the repair facility recommendation system 404 over one or more internal or external networks, such as the Internet.

As described in more detail below, the repair facility recommendation system 404 analyzes the information received from the user device 402 and data stored at the services 406 to identify one or more repair facilities to recommend to the user. It will be appreciated that one of the sources of data that the repair facility recommendation system 404 utilizes in identifying repair facilities is the verification/coaching data that is collected utilizing the coaching system for collision repair services described above with respect to FIGS. 1-3.

After identifying one or more repair facilities that may perform the repair, the repair facility recommendation system 404 communicates with the user device 402 to provide recommended repair facilities to the user. In some implementations, the user device 402 displays the recommend repair facilities to the user within a webpage on an Internet browser or a stand-alone application, and the user may interact with the user device 402 to select one of the recommended repair facilities to gain additional information on the selected repair facility.

In some implementations, when the repair facility recommendation system 404 receives an indication from the user device 402 that the user has selected a repair facility to perform the repair, the facility recommendation system 404 may send information on the user and the desired vehicle repair to the selected repair facility. Moreover, in collaboration with a service providing verification and coaching such as those described above with respect to FIGS. 1-3, the verification/coaching service may monitor the actual repair requested by the user and update the verification/coaching data stored at the coaching system for collision repair services 406 in order to provide improved repair facility recommendations in the future.

Figure 5A:
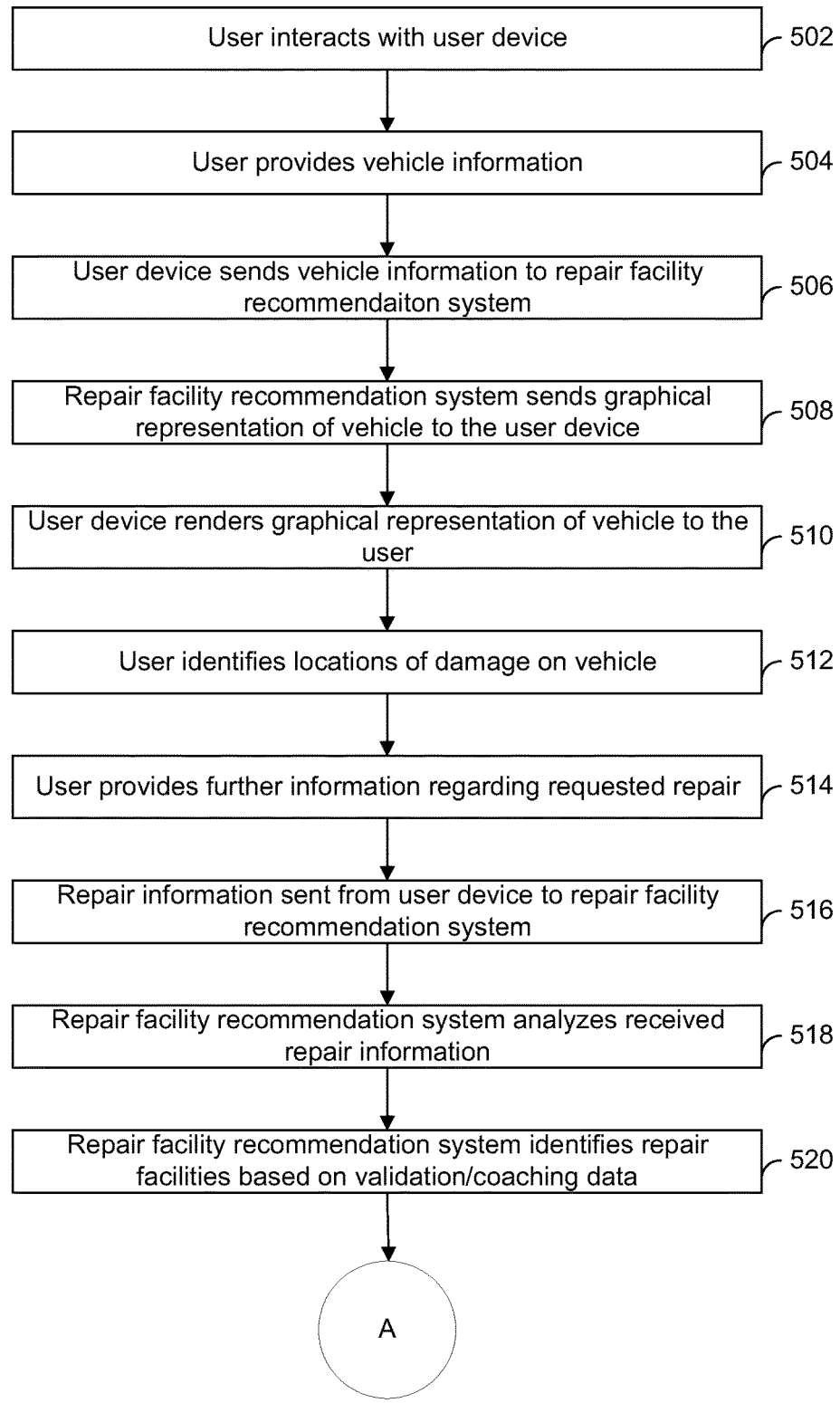
FIGS. 5a and 5b illustrate one implementation of a method for providing suggested repair facilities to a user based on repair validation/coaching data.
Figure 5B:
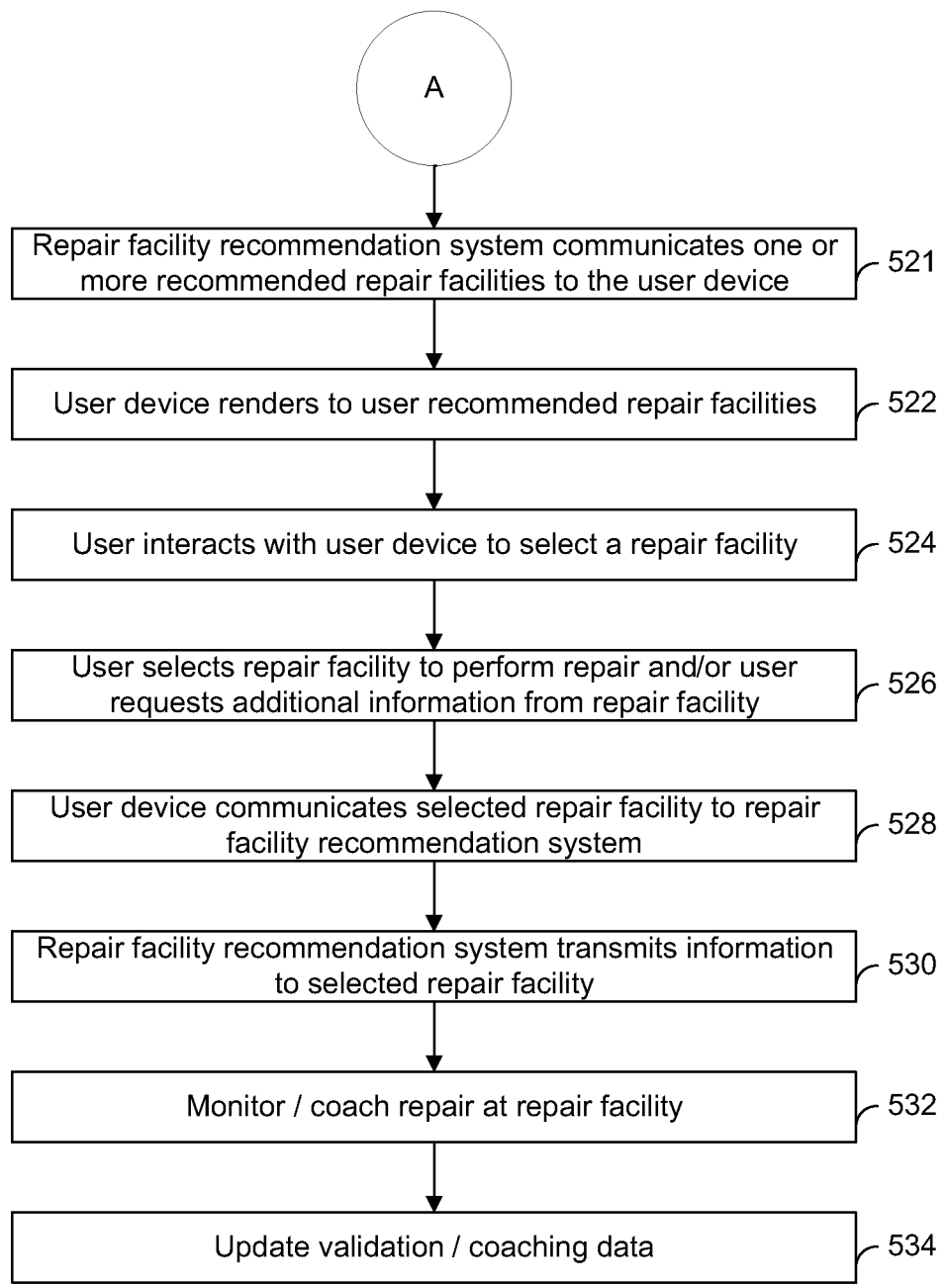

FIGS. 5a and 5b are a method of one implementation for providing suggested repair facilities to a user. The method begins at step 502 with a user interacting with a graphical user interface of a repair facility recommendation system that is rendered on a user device such as a personal computer, a tablet computer, or a cellular phone.

At step 504, the user interacts with the user device to provide information identifying a make, model, year, and/or VIN of the vehicle to be repaired. At step 506, the user device sends the vehicle information to the repair facility recommendation system.

At step 508, the repair facility recommendation system sends a graphical representation of the vehicle to the user device, and at step 510, the user device renders a graphical representation of the vehicle to the user. At step 512, the user interacts with the graphical representation of the vehicle to identify one or more locations on the vehicle to be repaired and a degree of damage to the vehicle. It will be appreciated that the user may utilize a mouse to click on locations of the graphical representation of the vehicle, or when using devices such as a tabled computer or a cellular phone, the user may touch locations on the graphical representation of the vehicle.

At step 514, the user interacts with the user device to provide additional information on the requested repair such as whether or not the vehicle is drivable; a preferred geographical location for the repair facility; a preferred distance from the user for the geographic location of the repair facility; and/or any other type of information that may be useful to the repair facility recommendation system in identifying repair facilities that are able to perform the requested repair. At step 516, the repair information is sent from the user device to the repair facility recommendation system.

At step 518, the repair facility recommendation system analyzes the received repair information, and at step 520, the repair facility recommendation system identifies, based on verification/coaching data, one or more repair facilities that are verified to repair damage to the vehicle identified in the repair information received from the user. It will be appreciated that the verification/coaching data may be information comprising evaluation information that is based on evaluations of technicians performing repairs of vehicles at repair facilities. One method for generating such verification/coaching data is described above with respect to FIGS. 1-3.

In some implementations, the repair facility recommendation system analyzes the repair information received from the user to determine the specific repair procedures that a technician should perform to repair the vehicle. The repair facility recommendation system then utilizes the validation/coaching data to identify local repair facilities where technicians have been verified as being proficient in the necessary repair procedures.

At step 521, the repair facility recommendation system communicates one or more of the repair facilities identified at step 518 to the user device. At step 522, the user device renders one or more of the identified repair facilities to the user. In some implementations, the user device may additionally display information such as rankings of the identified repair facilities based on the initial repair information provided by the user. The ranking may be based on, for example, verification and coaching scores on previous vehicle repairs that are similar to repairs that are required to repair the vehicle as identified in the repair information from the user and/or a geographic location of a repair facility in relation to the user.

At step 524, the user may interact with the user device to select one of the identified repair facilities in order to obtain additional information on the selected repair facilities. For example, the user may obtain a geographic location of a selected repair facility; contact information for a selected repair facility; user reviews of a selected repair facility; verification/coaching scores of a selected repair facility; information on the repair facility's proficiency with respect to cosmetics steel, structural steel, cosmetics aluminum, structural aluminum, cosmetic composites, and/or structure composites; and/or or any other type of information that the repair facility recommendation system is able to provide to the user to assist the user in selecting a repair facility to perform the vehicle repair.

In some implementations, at step 526, the user may interact with the user device to make a selection of a repair facility to perform the vehicle repair or a selection to receive additional information from a specific repair facility itself. The selection of the repair facility is communicated to the repair facility recommendation system at step 528. In response, the repair facility recommendation system may transmit information to the selected repair facility at step 530. For example, the repair facility recommendation system may e-mail contact information of the user and/or details on the vehicle and areas of damage to the vehicle to the selected repair facility.

Further, when acting in collaboration with a service providing verification and coaching such as those described above with respect to FIGS. 1-3, the verification/coaching service may monitor the actual repair requested by the user at step 532 and update the verification/coaching data at step 534. It will be appreciated that by updating the verification/coaching data, the repair facility recommendation system is able to provide improved repair facility recommendations in the future.

FIGS. 1-5 and the accompanying descriptions teach systems and methods for recommending repair facilities to a user based on repair validation/coaching data. As discussed above, a user interacts with a repair facility recommendations system via a user device. The user provides information such as the type of vehicle to be repaired, the areas of damage to the vehicle, and the extent of the damage to the vehicle. The repair facility recommendation system processes the received information and utilizes information such as validation/coaching data to identify one or more recommended repair facilities where technicians have performed similar repairs on similar vehicles. By utilizing validation/coaching data to identify repair facilities to recommend to the user, the repair facility recommendation system is able to demonstrate to the user that recommended repair facilities have shown an ability to accurately and efficiently perform similar repairs.

While various embodiments of the invention have been described, it will be apparent to those of ordinary skill in the art that other embodiments and implementations are possible that are within the scope of the invention. Accordingly, the invention is not to be restricted except in light of the attached claims and their equivalents.

The invention claimed is:

1. A computer-implemented method for providing recommended collision repair facilities, the method comprising:
    querying, with one or more processors of a collision repair facility recommendation system, a coach for evaluation information on specified steps in an automobile collision repair procedure, where the evaluation information comprises scores on the specified steps that are provided by the coach based on visual observation and validation of technicians performing the specified steps in the automobile collision repair procedure at a repair facility;
    receiving, with the one or more processors, the evaluation information in response to the querying on specified steps in the automobile collision repair procedure;
    receiving, with the one or more processors, repair information over a network from a user regarding collision damage to an automobile;
    identifying, with the one or more processors, a repair facility verified to repair the collision damage to the automobile based on the repair information and verification information, the verification information comprising the evaluation information that was scored based on visual observation and validation of technicians performing specified steps in the automobile collision repair procedure; and
    providing, with the one or more processors, information regarding the identified repair facility to the user over the network.

2. The method of claim 1, wherein the repair information received from the user comprises a make, model and year of the automobile.

3. The method of claim 2, wherein the repair information received from the user further comprises a vehicle identification number ("VIN") of the automobile.

4. The method of claim 2, wherein the repair information received from the user further comprises a location of the damage on the automobile.

5. The method of claim 4, wherein the user indicates the location of the damage on the automobile by clicking on a graphical representation of the automobile rendered on a webpage.

6. The method of claim 2, where the repair information received from the user comprises an indication of whether the vehicle is likely to be driveable.

7. The method of claim 1, wherein providing information regarding the identified repair facility to the user comprises:
providing an indication to the user regarding whether the identified repair facility is a top match for the repair information provided by the user.

8. The method of claim 1, wherein providing information regarding the identified repair facility to the user comprises:
providing an indication to the user regarding a proficiency of the identified repair facility in at least one of cosmetics steel, structural steel, cosmetics aluminum, structural aluminum, cosmetics composite and structural composite.

9. The method of claim 1, further comprising:
evaluating a repair of the automobile at the identified repair facility that is associated with the repair information; and
updating verification information associated with the identified repair facility based on the evaluation of the repair of the automobile at the repair facility.

10. The method of claim 1, further comprising:
receiving over the network a selection of the identified repair facility from the user; and
sending at least a portion of the repair information to the identified repair facility.

11. A system for providing recommended collision repair facilities, the system comprising:
a server comprising one or more processors and a non-transitory computer-readable storage medium storing a set of instructions for providing recommended repair facilities;
wherein the one or more processors are configured to execute the set of instructions stored in the computer-readable storage medium and to:
query a coach for evaluation information on specified steps in an automobile collision repair procedure, where the evaluation information comprises scores on the specified steps that are provided by the coach based on visual observation and validation of technicians performing the specified steps in the automobile collision repair procedure at a repair facility;
receive the evaluation information in response to the querying on specified steps in the automobile collision repair procedure;
receive repair information over a network from a user regarding collision damage to an automobile;
identify a repair facility verified to repair the collision damage to the automobile based on the repair information and verification information, the verification information comprising the evaluation information that was scored based on visual observation and validation of technicians performing specified steps in the automobile collision repair procedure; and
provide information regarding the identified repair facility to the user over the network.

12. The system of claim 11, wherein the repair information received from the user comprises a make, model and year of the automobile.

13. The system of claim 12, wherein the repair information received from the user further comprises a vehicle identification number ("VIN") of the automobile.

14. The system of claim 12, wherein the repair information received from the user further comprises a location of the damage on the automobile.

15. The system of claim 12, where the repair information received from the user comprises an indication of whether the vehicle is likely to be driveable.

16. The system of claim 11, wherein to provide information regarding the identified repair facility to the user, the one or more processors is further configured to:
provide an indication to the user regarding whether the identified repair facility is a top match for the repair information provided by the user.

17. The system of claim 11, wherein to provide information regarding the identified repair facility to the user, the one or more processors is further configured to:
provide an indication to the user regarding a proficiency of the identified repair facility in at least one of cosmetics steel, structural steel, cosmetic aluminum, structural aluminum, cosmetic composite and structural composite.

18. The system of claim 11, wherein the one or more processors is further configured to:
evaluate a repair of the automobile at the identified repair facility that is associated with the repair information; and
update verification information associated with the identified repair facility based on the evaluation of the repair of the automobile at the repair facility.

19. The system of claim 11, wherein the one or more processors is further configured to:
receive a selection of the identified repair facility from the user via the graphical user interface rendered on the webpage; and
send at least a portion of the repair information to the identified repair facility.

20. A non-transitory computer-readable storage medium storing a set of instructions, the set of instructions configured to direct one or more processors of a repair recommendation system to perform acts of:
querying a coach for evaluation information on specified steps in an automobile collision repair procedure, where the evaluation information comprises scores on the specified steps that are provided by the coach based on visual observation and validation of technicians performing the specified steps in the automobile collision repair procedure at a repair facility;
receiving the evaluation information in response to the querying on specified steps in the automobile collision repair procedure;
receiving over a network repair information from a user regarding collision damage to an automobile;
identifying a repair facility verified to repair the collision damage to the automobile based on the repair information and verification information, the verification information comprising the evaluation information that was scored based on visual observation and verification of technicians performing specified steps in the automobile collision repair procedure; and
providing information regarding the identified repair facility to the user over the network.

21. The method of claim 1, wherein the repair information is received via a graphical user interface rendered on a webpage.

22. The method of claim 21, wherein the information regarding the identified repair facility is provided to the user via the graphical user interface.

23. The method of claim 1, wherein the repair information received from the user comprises a photograph.

* * * * *